United States Patent
Ekman et al.

(10) Patent No.: US 6,906,135 B2
(45) Date of Patent: Jun. 14, 2005

(54) GRAFT COPOLYMERS

(75) Inventors: Kenneth Ekman, Piiapanristi (FI); Robert Peltonen, Kaarina (FI); Mats Sundell, Littoinen (FI)

(73) Assignee: Johnson Matthey Public Limited Company, London (GB)

( * ) Notice: Subject to any disclaimer, the term of this patent is extended or adjusted under 35 U.S.C. 154(b) by 84 days.

(21) Appl. No.: 10/399,615

(22) PCT Filed: Oct. 17, 2001

(86) PCT No.: PCT/GB01/04637

§ 371 (c)(1),
(2), (4) Date: Apr. 21, 2003

(87) PCT Pub. No.: WO02/36648

PCT Pub. Date: May 10, 2002

(65) Prior Publication Data

US 2004/0034117 A1 Feb. 19, 2004

(51) Int. Cl.[7] ........................... C08J 9/36; C08F 255/00

(52) U.S. Cl. ........................... 525/69; 525/243; 522/85; 522/86; 522/114; 522/117

(58) Field of Search .................... 525/69, 243; 522/84, 522/85, 86

(56) References Cited

U.S. PATENT DOCUMENTS

| | | | |
|---|---|---|---|
| 4,605,685 A | | 8/1986 | Momose et al. |
| 5,411,994 A | * | 5/1995 | Galli et al. ................. 521/50.5 |
| 5,571,869 A | | 11/1996 | Lee et al. |
| 5,817,707 A | | 10/1998 | DeNicola, Jr. et al. |

FOREIGN PATENT DOCUMENTS

| | | |
|---|---|---|
| EP | 0 437 808 | 7/1991 |
| EP | 0 893 164 | 1/1999 |
| JP | 55-108413 | * 8/1980 |
| WO | WO 00/15679 | 3/2000 |

OTHER PUBLICATIONS

Abstract of Japanese Patent No. 62193604 (published Aug. 25, 1987).
Abstract of Japanese Patent No. 1262794 (published Oct. 19, 1989).
Abstract of Japanese Patent No. 4202441 (published Jul. 23, 1992).
Abstract of Japanese Patent No. 4309535 (published Nov. 2, 1992).
Abstract of Japanese Patent No. 6206951 (published Jul. 26, 1994).
Abstract of Japanese Patent No. 10168136 (published Jun. 23, 1998).
International Search Report, from International Application No. PCT/GB01/04637, dated Jan. 30, 2002.
British Search Report, from British Application No. 0026756.7, dated Jan. 18, 2001.

* cited by examiner

Primary Examiner—James J. Seidleck
Assistant Examiner—Irina S. Zemel
(74) Attorney, Agent, or Firm—RatnerPrestia

(57) ABSTRACT

A process for the production of a graft copolymer comprises reacting an irradiated polymer in a reaction mixture comprising a first phase and a second phase. The first phase comprises a source of at least one non-water soluble monomer and the second phase comprises water and optionally, a water miscible organic solvent. The first and second phases are substantially immiscible and non-emusified. A high degree on monomer conversion is achieved.

14 Claims, No Drawings

GRAFT COPOLYMERS

This application is the U.S. National Phase application of International Application No. PCT/GB01/04637.

This invention relates to an improved process for the preparation of graft copolymers using radiation induced grafting and to graft copolymers made by such a process. The invention also relates to the graft copolymers so produced as supports for catalytically active species.

The technology of modifying the properties of polymer materials has interested chemists since the beginning of the nineteenth century. Early developments included the modification of rubber by isomerisation with acid and by vulcanisation with sulphur. These developments inspired chemists to more systematic work in applying organic chemistry pathways to modify the surface or bulk properties of polymers. To date a large number of synthetic polymers have been prepared and a number of different techniques have been developed to change or improve the properties of polymers. The chemical modification of polymers has-become a wide domain of polymer science and techniques such as corona discharge, plasma and grafting are frequently employed for modification.

Generally, any reaction of classical organic chemistry can be applied to modify or functionalise a polymer and reactions can be carried out in solution, in the melt or in the solid state. Cis-trans isomerisations of polydienes, cyclisation of polyacrylonitrile, addition of maleic anhydride onto double bonds, and hydrolysis of polyvinyl acetate to polyvinyl alcohol are examples of reactions that can be carried out in solution.

During the last twenty years, the modification of polymers using radiation has become very important in polymer science and technology. The breakthrough in the industrial use of radiation took place in the 1950's with the discovery of the crosslinking of polyethylene using high energy radiation. Today the changes induced by radiation on the properties of the most common polymers are well studied and documented. Applications such as radiation stabilisation and radiation induced polymerisation, crosslinking and grafting have gained central industrial importance.

Irradiation leads to the formation of reactive species in the polymers being irradiated. This can initiate chemical reactions. The process of grafting, whereby side chains are attached to a host polymer, can be initiated by irradiation. The grafted polymer has distinctively different properties than those of the original polymer. If the side chains comprise dissimilar monomer units to the host polymer, then the polymer is a copolymer, whereas a homopolymer is formed when the monomer units and the host polymer are similar. Among the different grafting techniques (TV, plasma, chemical initiation) graft copolymerisation induced by high energy radiation offers an attractive method of preparing new polymers for novel applications.

Most radiation grafting reactions utilise free radicals formed during irradiation, and occur by a free radical mechanism. Ionic grafting processes using ionising radiation are possible but are restricted by the need to use high vacuum and extremely dry experimental conditions.

Historically, radiation grafting has used low dose rate gamma rays from $^{60}Co$ sources. During the past 10 years however, there has been much interest in using high energy electrons from accelerators with high dose rates. High dose rates make radiation grafting processes commercially more attractive.

There are three common methods of radiation grafting: mutual, pre-irradiation and peroxide methods. In mutual (or direct) grafting, the polymer is irradiated in the presence of the monomer. This is a simple and effective method since the free radicals initiate polymerisation immediately as they are generated. The disadvantage of this method is however, that simultaneous graft copolymerisation and homopolymerisation occurs upon irradiation. This reduces the yield of the desired copolymer. There are limited possibilities to alter the ratio of graft copolymerisation versus homopolymerisation for example, by the addition of compounds such as Mohr's salt or $FedI_3$, or by the careful choice of the polymer-monomer system.

In a pre-irradiation process, the polymer is irradiated in an inert atmosphere and is subsequently immersed in a monomer solution. The process requires additional steps in comparison to direct grafting, but has the advantage that only a small amount of homopolymer is formed, mainly by a chain transfer process. The grafting process is initiated by trapped radicals that are formed during irradiation and is controlled by the diffusion of the monomer into the polymer. It can be facilitated by the use of solvents that are able to swell the graft copolymer formed.

The peroxide process follows much the same process mechanism as pre-irradiation grafting. The main difference is that the polymer is irradiated in the presence of oxygen, thus forming peroxides and hydroperoxides that are stable and can be stored in the polymer for a long period of time. Grafting is activated by cleavage of the peroxides or the hydroperoxides by heat, UV-light or catalysis in a monomer solution.

One of the main concerns using radiation grafting on a production scale is achieving a high conversion of the monomers used for grafting. A high conversion is not only is economically desirable, but also decreases the amount of waste material to be disposed of, and minimises the need for monomer recycling. It is clearly desirable to develop radiation grafting processes with high monomer conversion.

WO 00/15679 describes a water based grafting process in which monomer units are grafted onto a cross linked polymer from a reaction mixture which comprises an emulsion of the monomer in water. Emulsifiers such as alkyl sulphates and fatty acid esters are used in relatively high proportions of up to 15 wt % of the reaction mixture in order to improve wetting of the polymer and the stability of the emulsion.

U.S. Pat. No. 5,817,707 describes a process for making a graft copolymer of a porous propylene polymer and a vinyl monomer. The reaction mixture includes water and a surfactant. The function of the surfactant is to produce an emulsion with water-immiscible monomers by forming stable micelles, as well as improving the solubility of the monomer in the aqueous phase. The surfactants may be an anionic, cationic or non-ionic.

A novel grafting process with significantly increased monomer conversion has been developed. The monomer solutions used in the pre-irradiation and peroxide grafting processes contain monomers immiscible in water. The process of the invention is effective during grafting of such water immiscible monomers. If water is added to these solutions, two separate phases are formed. When irradiated polymer fibres are added to the monomer solutions, the fibres are forced into the phase containing the monomers. This leads to a dramatic increase in monomer conversion. Thorough agitation of the solution is also beneficial to high monomer conversion Accordingly, the invention provides a process comprising reacting an irradiated polymer in a reaction mixture comprising a first phase and a second phase; wherein the first phase comprises a source of at least one non-water soluble monomer; wherein the second phase comprises water; and wherein the first and second phases are substantially immiscible and non-emulsified.

Preferably, the second phase further comprises a water miscible organic solvent.

The invention further provides grafted copolymers made by such a process.

Suitable polymers include polyolefins and fluorinated polyolefins, particularly polyethylene, but other polymers may also be considered, and the invention applied advantageously to such polymers.

The polymer may be in any form, including especially beads and fibres, although there may be technical interest in other forms such as films.

The monomers in the reaction mixture may comprise any non-water soluble monomers however preferably, the monomers are selected from the group of styrene and derivatives, vinyl benzyl derivatives such as vinyl benzyl chloride, styryl diphenyl phosphine, vinyl benzyl boronic acid, vinyl benzyl aldehyde and derivatives, α-methyl styrene, α-methyl styrene derivatives such as m-isopropyl-α,α-dimethyl benzyl isocyanate, vinyl acetate, vinyl pyridine and vinyl sulphonic acid. If the reaction mixture comprises more than one type of monomer, the resulting polymer will have varied monomer units.

Suitably, water comprises from 5 to 80% by weight of the reaction mixture, preferably between 20 and 50% by weight.

Suitably, the water miscible organic solvent comprises an alcohol or another water miscible solvent and preferably, the water miscible organic solvent comprises ethanol.

The irradiation step may be carried out in an inert atmosphere. In this case the process is a pre-irradiation grafting process. The atmosphere is suitably nitrogen.

If irradiation is carried out in an inert atmosphere, it is desirable to remove in advance any dissolved oxygen from the reaction mixture before the polymer is added. This may be achieved by for example, purging the mixture with nitrogen.

In the first embodiment, after the irradiation step, the irradiated polymer is immersed in the reaction mixture. Preferably, immersion is substantially immediately or shortly after irradiation, although a longer interval between irradiation and immersion may still be effective.

In a further embodiment, the irradiation step may be carried out in the presence of oxygen. In this case, the process is a peroxide grafting process and suitably, further comprises a cleavage step after the immersion of the irradiated polymer in the reaction mixture. The peroxides or hydroperoxides are cleaved and grafting is initiated by for example, heat, by the application of UV light, or by catalysis.

Irradiation of the polymer can be carried out with any suitable form of ionising radiation, suitably accelerated electrons. The radiation dose delivered is dependent on the polymer and the specifications of the final product. Typically, the dose is in the range of 50 kGy to 300 kGy.

In the pre-irradiation embodiment of the process it can be useful to add small amounts of an initiator such as benzoyl peroxide. It may be necessary to heat the solution to cleave the initiators.

It may be beneficial to add cross-linkers. Di- or tri-functional monomers can cross-link the graft chains thus altering the characteristics of the final product. Suitable cross-linkers include divinyl benzene, di- or tri(meth) acrylate and di- or tri(meth)acrylamide.

The polymer may be irradiated and then suspended in the reaction mixture and permitted to react with the monomer. Alternatively, the polymer may be suspended in the second phase and irradiated. The monomer (first phase) may then be added to form the reaction mixture, or the second phase containing the irradiated polymer may be added to the first phase.

The reaction, of monomer with irradiated polymer may be carried out at ambient temperature, or at elevated temperature, e.g. up to 100° C. under ambient pressure.

After completion of the reaction, separation of the polymer is suitably achieved, by filtering. Washing is preferably carried out to remove any residual monomer or homopolymer formed during the reaction. A suitable washing procedure comprises firstly washing with ethanol, and then with dichloroethane or acidified water.

The grafting process according to the invention has many advantages. The conversion of the monomers added to the graft solution is close to 100%, and thus expensive recovery and recycling of the monomers can be reduced. Accordingly, the process is more environmentally friendly since the formation of waste material is minimised. The process is also more easily controlled allowing variation from batch to batch to be avoided, leading to improved product quality.

By using the graft process according to the invention it is easy to prepare graft copolymers with a pre-determined capacity of functional groups. Monomer conversion is significantly higher than that which can be achieved using conventional grafting techniques, giving a higher density of graft chains. Preferably, monomer conversion is greater than 60%, more preferably greater then 70%, and in some cases greater than 90%.

The graft copolymers can be further modified using conventional organic chemical reactions. For example, aminations, lithiations, chlorinations, brominations, esterifications, etherfications, Suzuki and Heck couplings etc., can be used to provide chemically modified graft copolymers.

The graft copolymers or chemically modified graft copolymers can be loaded with one or more metals or metallic species to form catalytically active materials. This may be achieved by any suitable method for example, by immersing the graft copolymers in a solution of the metal or metals of interest. Examples of suitable metals are known in the art and include the platinum group metals, such as Pt, Pd, Ru, Rh, Ir and Os, and transition metals, such as Fe and Ni. The performance of such catalysts can be tailored by changing the metal content, the ratio of different metals and the chemical functionality of the graft polymer. The catalysts so formed may be used for any suitable catalytic process or reaction for example, Suzuki-Miyaura couplings and Heck reactions. Catalyst supports comprising graft copolymers produced using the process described herein form a further aspect of the present invention.

The skilled person will be able to see many ways of producing improved graft copolymers and chemically modified graft copolymers in accordance with the invention.

It is believed that the invention provides novel graft copolymers useful in many fields but especially in catalysis and ion-exchange to recover or refine metals. Tests are ongoing to establish the definition and/or analysis of such novel copolymers. It is the intention of the Applicants to claim all novel processes, products and products derived from the present invention.

The invention will now be illustrated by way of example only.

EXAMPLE 1

350 g of cut polyethylene fibres (0.7 Dtex) were irradiated in an inert atmosphere to a total dose of 150 kGy using an electron accelerator operating at an acceleration voltage of 175 kV and beam current of 5 mA. The irradiated fibres were immediately immersed in a reaction mixture containing 203 g 4-vinyl pyridine, 412 g ethanol and 612 g water. The reaction mixture was purged with nitrogen before initiating the reaction and the grafting reaction was allowed to continue to completion, which took approximately 6 hours.

The resulting fibres were filtered from the reaction mixture and washed with ethanol and finally with dichloroethane or with an acidified water solution. The weight gain of the recovered fibres was determined and the conversion of the monomer was calculated to be 100%.

EXAMPLE 2

Example 1 was repeated with a reaction mixture containing 200 g styrene, 600 g ethanol and 400 g water. The conversion of the monomer was calculated to be 82%.

EXAMPLE 3

Example 1 was repeated with a reaction mixture containing 203 g styrene, 400 g ethanol and 600 g water. 3 g of divinyl benzene and 3 g of a 25 wt % solution of dibenzoyl peroxide were also added to the reaction mixture. The reaction took approximately 2 hours to reach completion. After the 2 hours the solution temperature was raised to 80° C. and maintained there for 4 hours. The conversion of the monomer was calculated to be 91.7%.

EXAMPLE 4

Example 1 was repeated with 223 g of cut polyethylene fibres (0.7 Dtex) and a reaction mixture containing 153 g styrene, 23 g vinyl benzyl chloride, 588 g ethanol and 203 g water. The conversion of the monomer was calculated to be 80%.

EXAMPLE 5

Example 1 was repeated with 134 g of cut polyethylene fibres (0.7 Dtex) and a reaction mixture containing 116 g styrene, 80 g vinyl benzyl chloride, 166 g ethanol and 308 g water. 1 g of divinyl benzene and 1 g of a 25 wt % solution of dibenzoyl peroxide were also added to the reaction mixture. The conversion of the monomer was calculated to be 99.5%.

EXAMPLE 6

Example 1 was repeated with 10 g of cut polyethylene fibres (0.7 Dtex) and a reaction mixture containing 20 g styrene, 5 g styryl diphenyl phosphine, 50 g ethanol and 20 g water. 0.15 g of divinyl benzene and 0.135 g of a 25 wt % solution of dibenzoyl peroxide were also added to the reaction mixture. After the reaction was complete the temperature was raised to 80° C. for 1 hour. The conversion of the monomer was calculated to be 76%. Elemental analysis of the copolymer gave a phosphorus content of 1.79%, indicating the extent of grafting of the styryl diphenyl phosphine.

EXAMPLE 7

Example 1 was repeated with 10 g of cut polyethylene fibres (0.7 Dtex) and a reaction mixture containing 20 g styrene, 2 g styryl diphenyl phosphine, 50 g ethanol and 20 g water. 0.02 g of divinyl benzene and 0.2 g of a 25 wt-% solution of dibenzoyl peroxide were also added to the reaction mixture. After the reaction was complete the temperature was raised to 80° C. for 1 hour. The conversion of the monomers was calculated to be 91%. Elemental analysis gave a phosphorus content of 0.76%.

EXAMPLE 8

Example 1 was repeated with 10 g of cut polyethylene fibres (0.7 Dtex) and a reaction mixture containing 20 g styrene, 0.5 g vinyl phenyl boronic acid, 50 g ethanol and 20 g water. 0.03 g of divinyl benzene and 0.2 g of a 25 wt-% solution of dibenzoyl peroxide were also added to the reaction mixture. After the reaction was complete the temperature was raised to 80° C. for 1 hour. The conversion of the monomers was calculated to be 93%.

EXAMPLE 9

9a Preparation of Palladium Catalyst

Polyethylene fibres modified with styrene/styryldiphenylphosphine co-polymer prepared according to the invention (60 g batch) were stirred in dichloromethane (480 ml). Palladium acetate (9.05 g, 1.25 equivalents relative to P in the polymer) was added. The mixture was stirred for two hours and the polymer fibres were then collected by filtration. They were washed thoroughly with dichloromethane and dried in air, then in vacuo.

Yield: 67.9 g

9b Suzuki-Miyaura Coupling using Catalyst Prepared as above in 9a

The Pd catalyst (20 mg) was mixed with 4-bromoacetophenone (1M in toluene, 1.65 ml) phenylboronic acid (0.305 g) and potassium carbonate (0.449 g) in toluene (3.35 ml). The mixture was stirred and heated to 70° C. under nitrogen. After two hours the solution was allowed to cool to room temperature and was filtered. Analysis of the filtrate by gas chromatography indicated complete conversion of 4-bromoacetophenone to 4-acetylbiphenyl.

9c Heck Reaction using Pd Catalyst Prepared as above in 9a

The Pd catalyst (20 mg) was mixed with 4-bromoacetophenone (0.71 g) n-butyl acrylate (0.64 g) and sodium acetate (0.32 g) in N,N-dimethylacetamide (5 ml). The mixture was stirred and heated to 100° C. for 24 hours under nitrogen. The solution was allowed to cool and was filtered. Analysis of the filtrate by gas chromatography indicated 97% conversion of 4-bromoacetophenone to 4-acetyl-n-butylcinnamate.

COMPARATIVE EXAMPLE 1

Example 1 was repeated with 250 g of cut polyethylene fibres (0.7 Dtex) and a reaction mixture containing only 1040 g styrene. No water was present in the reaction mixture. The conversion of the monomer was calculated to be 33%.

COMPARATIVE EXAMPLE 2

Example 1 was repeated with 100 g of cut polyethylene fibres (0.7 Dtex) and a reaction mixture containing only 460 g vinyl benzyl chloride and 200 g ethanol. No water was present in the reaction mixture. The conversion of the monomer was calculated to be 25%.

COMPARATIVE EXAMPLE 3

Example 1 was repeated with 115 g of cut polyethylene fibres (0.7 Dtex) and a reaction mixture containing only 427 g 4-vinyl pyridine and 210 g ethanol. No water was present in the reaction mixture. The conversion of the monomer was calculated to be 18%.

What is claimed is:

1. A process for the production of a graft copolymer, the process comprising reacting an irradiated polymer in a reaction mixture comprising a first phase and a second phase; wherein the first phase comprises a source of at least one non-water soluble monomer; wherein the second phase comprises water; and wherein the first and second phases are substantially immiscible and non-emulsified.

2. A process according to claim 1, wherein the second phase further comprises a water miscible organic solvent.

3. A process according to claim 1, wherein the polymer is a polyolefin or a fluorinated polyolefin.

4. A process according to claim 1, wherein the at least one non-water soluble monomer is selected from the group consisting of: styrene and derivatives, vinyl benzyl derivatives, vinyl benzyl chloride, styryl diphenyl phosphine, vinyl benzyl boronic acid, vinyl benzyl aldehyde and derivatives, α-methyl styrene, α-methyl styrene derivatives, m-isopropyl-α,α-dimethyl benzyl isocyanate, vinyl acetate, vinyl pyridine and vinyl sulphonic acid.

5. A process according to claim 1, wherein water comprises from 5 to 80% by weight of the reaction mixture.

6. A process according to claim 5, wherein water comprises from 20 to 50% by weight of the reaction mixture.

7. A process according to claim 2, wherein the water miscible organic solvent comprises an alcohol.

8. A process according to claim 7, wherein the alcohol comprises ethanol.

9. A process according to claim 1, wherein the polymer is irradiated in an inert atmosphere.

10. A process according to claim 1, wherein the polymer is irradiated in the presence of oxygen.

11. A process according to claim 1, wherein the reaction mixture further comprises an initiator.

12. A process according to claim 11, wherein the initiator comprises benzoyl peroxide.

13. A process according to claim 1, wherein the reaction mixture further comprises a cross-linker.

14. A process according to claim 13, wherein the cross-linker is selected from the group consisting of divinyl benzene, di- or tri- (meth) acrylate, or di-or tri-(meth) acrylamide.

* * * * *

UNITED STATES PATENT AND TRADEMARK OFFICE
CERTIFICATE OF CORRECTION

PATENT NO. : 6,906,135 B2
DATED : June 14, 2005
INVENTOR(S) : Kenneth Ekman et al.

It is certified that error appears in the above-identified patent and that said Letters Patent is hereby corrected as shown below:

<u>Title page,</u>
Insert Item:
-- [30]         Foreign Application Priority Data
   November 2, 2000     (GB).............................. 0026756 --.

Signed and Sealed this

Fourth Day of October, 2005

JON W. DUDAS
*Director of the United States Patent and Trademark Office*